(12) United States Patent
Kamada et al.

(10) Patent No.: US 9,989,127 B2
(45) Date of Patent: Jun. 5, 2018

(54) AUTOMATIC TRANSMISSION

(71) Applicant: MAZDA MOTOR CORPORATION, Hiroshima (JP)

(72) Inventors: Shinya Kamada, Kure (JP); Tatsuhiko Iwasaki, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days. days.

(21) Appl. No.: 15/506,132

(22) PCT Filed: Oct. 20, 2015

(86) PCT No.: PCT/JP2015/079530
§ 371 (c)(1),
(2) Date: Feb. 23, 2017

(87) PCT Pub. No.: WO2016/063857
PCT Pub. Date: Apr. 28, 2016

(65) Prior Publication Data
US 2017/0284516 A1 Oct. 5, 2017

(30) Foreign Application Priority Data
Oct. 23, 2014 (JP) ................. 2014-215959

(51) Int. Cl.
*F16H 3/66* (2006.01)
*F16H 57/08* (2006.01)
*F16H 57/10* (2006.01)

(52) U.S. Cl.
CPC .......... *F16H 3/666* (2013.01); *F16H 57/082* (2013.01); *F16H 57/10* (2013.01);
(Continued)

(58) Field of Classification Search
CPC ............... F16H 3/66; F16H 2200/0065; F16H 2200/2043; F16H 2200/2012
See application file for complete search history.

(56) References Cited

U.S. PATENT DOCUMENTS 3,835,732 A * 9/1974 Mori ................. F16H 3/66
475/276
6,752,737 B2 * 6/2004 Ishimaru ............. F16H 3/66
475/275
(Continued)

FOREIGN PATENT DOCUMENTS

| JP | S47-015557 A | 8/1972 | |
| JP | 2004183705 A * | 7/2004 | ............. F16H 3/663 |

(Continued)

OTHER PUBLICATIONS

International Search Report issued in PCT/JP2015/079530; dated Dec. 8, 2015.

*Primary Examiner* — Stacey Fluhart
(74) *Attorney, Agent, or Firm* — Studebaker & Brackett PC

(57) ABSTRACT

An automatic transmission includes a first planetary gear set, a second planetary gear set, and a first brake. A first sun gear includes a first split sun gear on a drive source side, and a second split sun gear on a side opposite to the drive source. The first spilt sun gear is coupled to the first brake, and is fixed to a transmission case during engagement of the first brake. The second split sun gear is constantly coupled to a second sun gear. An input shaft is constantly coupled to a first carrier while passing through the first split sun gear, and between the first and second split sun gears. An output shaft is constantly coupled to a second carrier.

4 Claims, 12 Drawing Sheets

(52) U.S. Cl.
CPC ........... *F16H 2200/0065* (2013.01); *F16H 2200/2012* (2013.01); *F16H 2200/2046* (2013.01); *F16H 2200/2064* (2013.01)

(56) References Cited

U.S. PATENT DOCUMENTS

| | | | |
|---|---|---|---|
| 6,884,197 B2 * | 4/2005 | Ishimaru | F16H 3/66 475/271 |
| 6,910,985 B2 * | 6/2005 | Ishimaru | F16H 3/66 475/271 |
| 2008/0234093 A1 | 9/2008 | Diosi et al. | |
| 2008/0305911 A1 | 12/2008 | Moorman et al. | |
| 2013/0150204 A1 | 6/2013 | Park et al. | |
| 2016/0281836 A1 * | 9/2016 | Iwasaki | F16H 57/043 |
| 2017/0268606 A1 * | 9/2017 | Park | F16H 3/66 |

FOREIGN PATENT DOCUMENTS

| | | |
|---|---|---|
| JP | 2009-500572 A | 1/2009 |
| JP | 2010-116941 A | 5/2010 |
| JP | 2013-119948 A | 6/2013 |

* cited by examiner

FIG. 3

|  | CL1 | CL2 | CL3 | BR1 | BR2 |
|---|---|---|---|---|---|
| 1ST GEAR POSITION | ○ |  |  | ○ | ○ |
| 2ND GEAR POSITION |  | ○ |  | ○ | ○ |
| 3RD GEAR POSITION | ○ | ○ |  |  | ○ |
| 4TH GEAR POSITION |  | ○ | ○ |  | ○ |
| 5TH GEAR POSITION | ○ |  | ○ |  | ○ |
| 6TH GEAR POSITION | ○ | ○ | ○ |  |  |
| 7TH GEAR POSITION | ○ |  | ○ | ○ |  |
| 8TH GEAR POSITION |  | ○ | ○ | ○ |  |
| REVERSE GEAR POSITION |  |  | ○ | ○ | ○ |

FIG. 10

|  | CL1 | CL2 | CL3 | CL4 | BR1 | BR2 |
|---|---|---|---|---|---|---|
| 1ST GEAR POSITION | ○ |  |  |  | ○ | ○ |
| 2ND GEAR POSITION |  | ○ |  |  | ○ | ○ |
| 3RD GEAR POSITION |  | ○ |  | ○ |  | ○ |
| 4TH GEAR POSITION | ○ | ○ |  |  |  | ○ |
| 5TH GEAR POSITION |  | ○ | ○ |  |  | ○ |
| 6TH GEAR POSITION | ○ |  | ○ |  |  | ○ |
| 7TH GEAR POSITION | ○ | ○ | ○ |  |  |  |
| 8TH GEAR POSITION | ○ |  | ○ |  | ○ |  |
| 9TH GEAR POSITION |  | ○ | ○ |  | ○ |  |
| REVERSE GEAR POSITION |  |  | ○ |  | ○ | ○ |

AUTOMATIC TRANSMISSION

TECHNICAL FIELD

The present invention relates to an automatic transmission to be mounted in a vehicle, and belongs to the technical field of vehicular automatic transmissions.

BACKGROUND ART

Generally, an automatic transmission to be mounted in a vehicle is provided with a plurality of hydraulic frictional engagement elements such as planetary gear sets, clutches, and brakes; and is configured to attain a plurality of forward gear positions and a usually one reverse gear position by selectively engaging these frictional engagement elements by hydraulic control for switching a power transmission path via each of the planetary gear sets. In recent years, however, the number of gear positions are tended to increase for the purpose of improving the traveling performance, improving the fuel economy of an engine, reducing electric power consumption of a drive motor, or the like.

For instance, Patent Literature 1 discloses, as illustrated in FIG. 11, an automatic transmission provided with three planetary gear sets PG11, PG12, PG13, four clutches CL11, CL12, CL13, CL14, and two brakes BR11, BR12, wherein two of these clutches and brakes are engaged to attain nine forward gear positions and one reverse gear position.

The automatic transmission described in Patent Literature 1 is a transversely disposed automatic transmission for use in an FF vehicle (a front-engine front-drive vehicle) or the like, and is mounted in a posture in which the axis thereof is aligned with the vehicle width direction. Power from a power source such as an engine or a motor is input from an input shaft A disposed on the axis, and power via a transmission mechanism constituted by the planetary gear sets, the clutches, and the like is output from an output portion B formed on a carrier C13 of the third planetary gear set PG13 to an unillustrated shaft disposed in parallel to the input shaft A via a gear or the like.

There is a case, in which a transversely disposed automatic transmission is changed to a longitudinally disposed automatic transmission usable for an FR vehicle (a front-engine rear-drive vehicle), namely, an automatic transmission, in which an input shaft and an output shaft are coaxially disposed in the vehicle front-rear direction without changing the configuration of the transmission mechanism. However, in the automatic transmission disclosed in Patent Literature 1, the output portion B is disposed between the third planetary gear set PG13 and the second brake BR12, and a coupling member C for coupling a sun gear S13 of the third planetary gear set PG13 and the second brake BR12 exists on the inner peripheral side of the output portion B. Therefore, in the aforementioned configuration, it may not be possible to couple the output portion B to the output shaft disposed coaxially with the input shaft A.

On the other hand, as illustrated in FIG. 12, if the third planetary gear set PG13 is configured as a double sun gear type planetary gear set in which a sun gear is split into axially aligned first and second sun gears S131 and S132, and an output portion B' passing between the first and second sun gears S131 and S132 and extending radially inwardly is formed on the carrier C13, it is possible to couple the output portion B' to an output shaft D disposed coaxially with the input shaft. This makes it possible to change a transversely disposed automatic transmission to a longitudinally disposed automatic transmission without greatly changing the configuration of the automatic transmission.

However, in the configuration illustrated in FIG. 12, the output shaft D passes through the split sun gear S132 of the third planetary gear set PG13. In this case, it is necessary to set the diameter of the output shaft D large, as compared with the input shaft A in view of the necessity of transmitting a torque, which is larger than the input torque by the amount corresponding to a maximum speed reduction ratio. This may make the diameter of the sun gear S132 large, and the overall diameter of the third planetary gear PG13 may increase accordingly.

An increase in the diameter of the third planetary gear PG13 as described above may increase the diameter of an end portion of an automatic transmission on the output side. In particular, when an automatic transmission is disposed below a floor at the middle of a vehicle compartment front portion in the vehicle width direction of an FR vehicle, the width of a driver's seat and a passenger's seat in a vehicle compartment is limited. This may deteriorate the seating comfort. Note that the aforementioned inconvenience is an inconvenience common to a longitudinally disposed automatic transmission, in which a planetary gear set is disposed on an output shaft whose diameter is relatively large, regardless of the number of gear positions or other configuration.

CITATION LIST

Patent Literature

Patent Literature 1: Japanese Unexamined Patent Publication No. 2010-116941

SUMMARY OF INVENTION

In view of the aforementioned circumstances regarding an automatic transmission, an object of the present invention is to provide a compact longitudinally disposed automatic transmission that enables to reduce the diameter of an end portion of the automatic transmission on the output side.

In order to solve the aforementioned inconveniences, an automatic transmission of the present invention includes an input shaft coupled to a drive source; an output shaft disposed coaxially with the input shaft on a side of the input shaft opposite to the drive source; a first planetary gear set including a first sun gear, a first carrier, and a first ring gear; a second planetary gear set disposed on a side of the first planetary gear set opposite to the drive source, and including a second sun gear, a second carrier, and a second ring gear; a first brake disposed on a drive source side of the first planetary gear set; and a transmission case which accommodates the first planetary gear set, the second planetary gear set, and the first brake. The first sun gear includes a first split sun gear on a drive source side, and a second split sun gear on a side opposite to the drive source. The first split sun gear is coupled to the first brake, and is fixed to the transmission case during engagement of the first brake. The second split sun gear is constantly coupled to the second sun gear. The input shaft is constantly coupled to the first carrier while passing through the first split sun gear, and between the first and second split sun gears. The output shaft is constantly coupled to the second carrier.

According to the present invention, it is possible to reduce the diameter of an end portion of an automatic transmission on the output side.

BRIEF DESCRIPTION OF DRAWINGS

FIG. 3 is an engagement table of frictional engagement elements of the automatic transmission according to the first embodiment;

FIG. 10 is an engagement table of frictional engagement elements of the automatic transmissions according to the fourth and fifth embodiments;

DESCRIPTION OF EMBODIMENTS

In the following, embodiments of the present invention are described.

Figure 1:
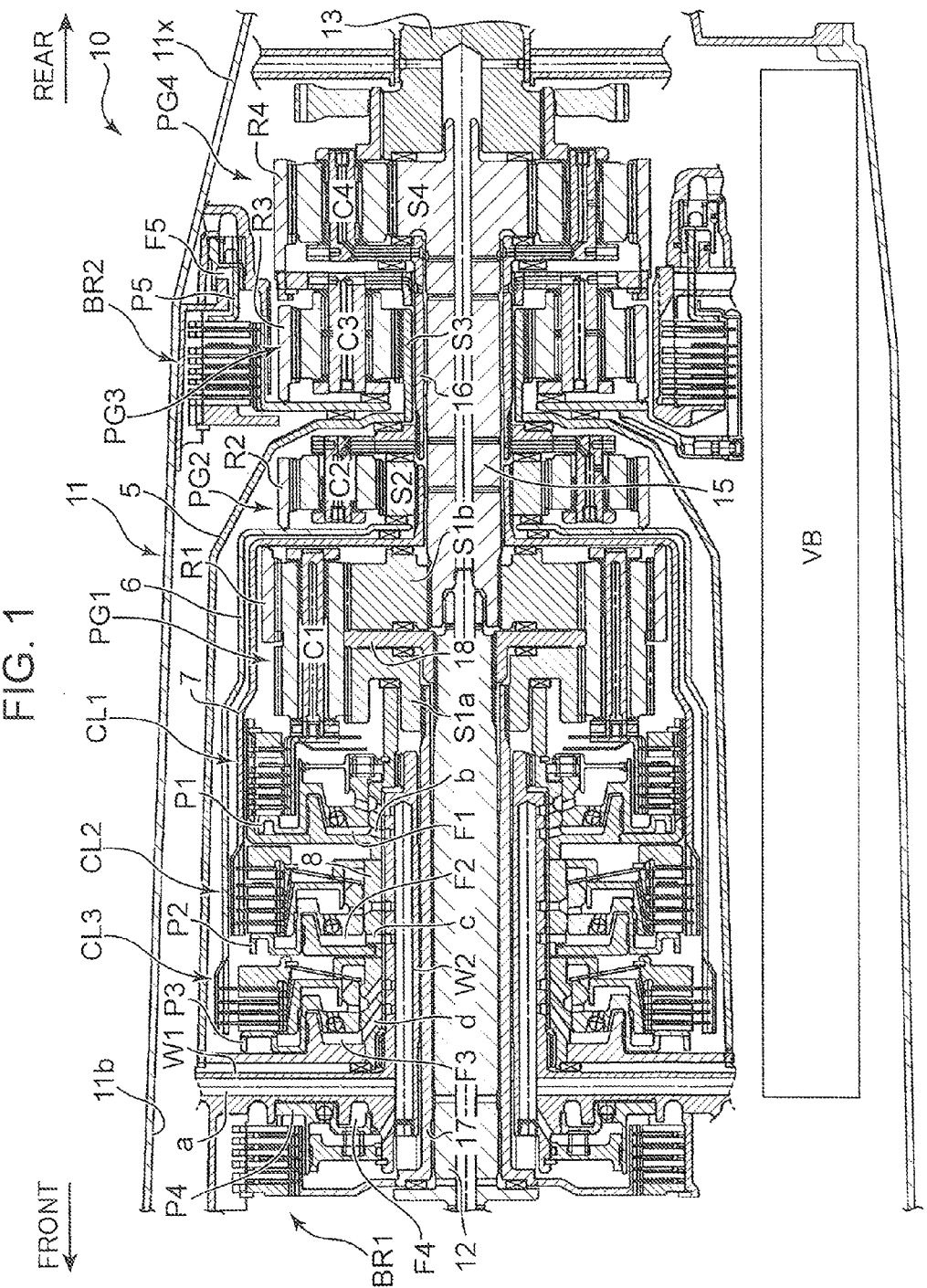
FIG. 1 is a sectional view of an automatic transmission according to a first embodiment of the present invention.
Figure 2:
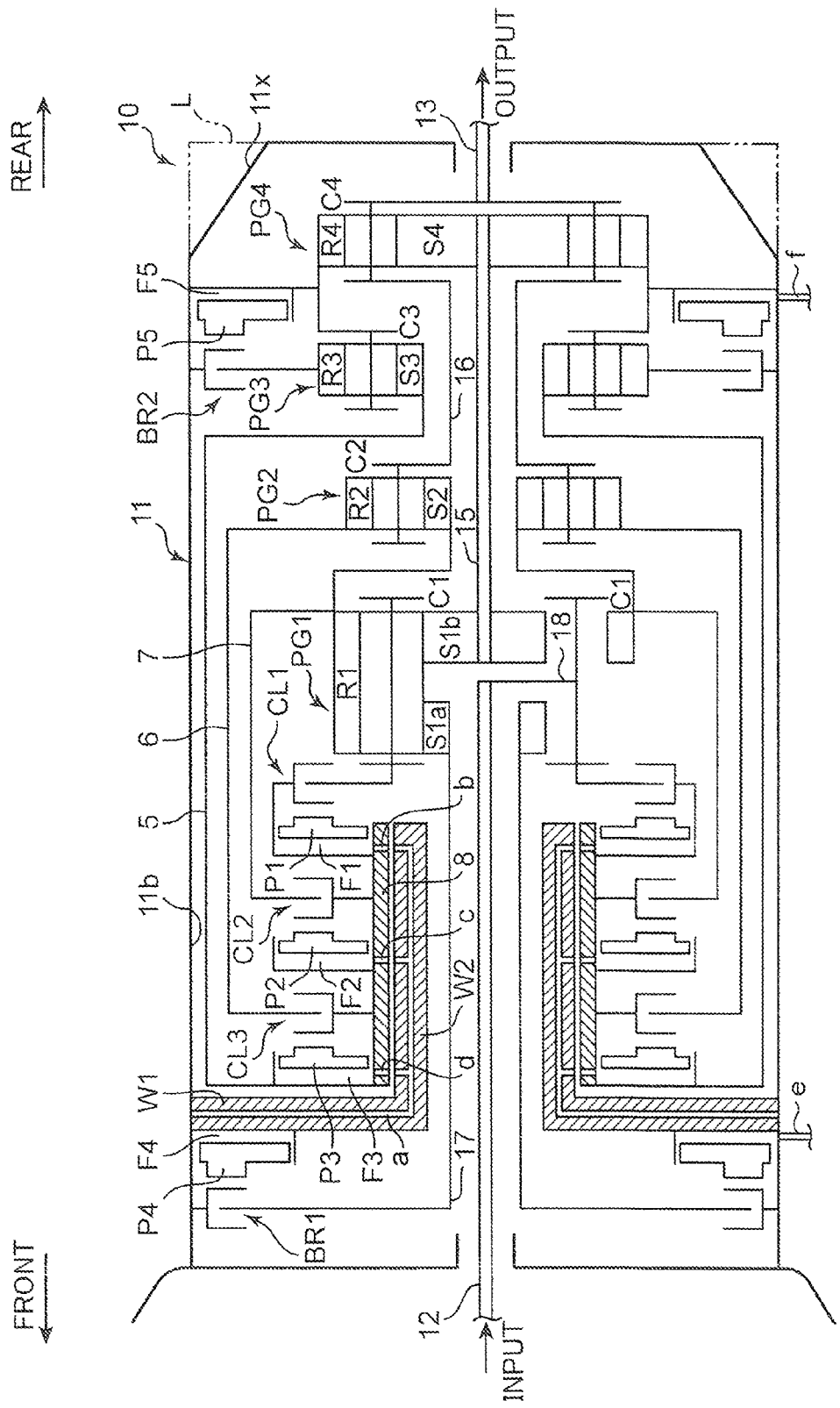
FIG. 2 is a conceptual diagram of the automatic transmission according to the first embodiment.

FIG. 1 and FIG. 2 are a sectional view and a conceptual diagram illustrating a configuration of an automatic transmission 10 according to a first embodiment of the present invention. The automatic transmission 10 is a longitudinally disposed automatic transmission to be mounted in a vehicle such as an FR vehicle. The automatic transmission 10 includes a transmission case 11, an input shaft 12 placed inside the transmission case 11 from a drive source (the left side in FIG. 1 and FIG. 2) of a vehicle, and an output shaft 13 projecting from the inside of the transmission case 11 to the side (the right side in FIG. 1 and FIG. 2) opposite to the drive source. The input shaft 12 and the output shaft 13 are coaxially disposed along the vehicle front-rear direction. The automatic transmission 10 is disposed in a longitudinal posture in which the input shaft 12 is located on the vehicle front side, and the output shaft 13 is located on the vehicle rear side. In view of this, in the following, the drive source side (the left side in FIG. 1 and FIG. 2) may be referred to as the front side, and the side opposite to the drive source (the right side in FIG. 1 and FIG. 2) may be referred to as the rear side.

A first planetary gear set PG1, a second planetary gear set PG2, a third planetary gear set PG3, and a fourth planetary gear set PG4 (hereinafter, simply referred to as "gear sets") are disposed in this order on the axes of the input shaft 12 and the output shaft 13 from the front side (from the drive source side).

Within the transmission case 11, a first clutch CL1 is disposed on the front side of the first gear set PG1, a second clutch CL2 is disposed on the front side of the first clutch CL1, and a third clutch CL3 is disposed on the front side of the second clutch CL2. Further, a first brake BR1 is disposed on the front side of the third clutch CL3. A second brake BR2 is disposed on the radially outside of the third gear set PG3. In this way, frictional engagement elements of the automatic transmission 10 (the first to third clutches CL1 to CL3, and the first and second brakes BR1 and BR2) are disposed in the axis direction in the order of the first brake BR1, the third clutch CL3, the second clutch CL2, the first clutch CL1, and the second brake BR2 from the front side (from the drive source side).

The first to fourth gear sets PG1 to PG4 are each of a single pinion type, in which a pinion supported on a carrier directly meshes with a sun gear and a ring gear. The first gear set PG1 includes, as rotary elements, a first sun gear S1, a first ring gear R1, and a first carrier C1. The second gear set PG2 includes, as rotary elements, a second sun gear S2, a second ring gear R2, and a second carrier C2. The third gear set PG3 includes, as rotary elements, a third sun gear S3, a third ring gear R3, and a third carrier C3. The fourth gear set PG4 includes, as rotary elements, a fourth sun gear S4, a fourth ring gear R4, and a fourth carrier C4.

Further, the first gear set PG1 is a double sun gear type gear set, in which the first sun gear S1 is split in the axis direction. Specifically, the first sun gear S1 includes a front-side first sun gear S1a disposed on the front side, and a rear-side first sun gear S1b disposed on the rear side in the axis direction. The paired first sun gears S1a and S1b have a same number of teeth, and mesh with a pinion supported on the first carrier C1. Therefore, the rotational speeds of the first sun gears S1a and S1b are the same. Specifically, the paired front and rear first sun gears S1a and S1b are constantly rotated at a same rotational speed. When rotation of one of the paired front and rear first sun gears S1a and S1b is stopped, rotation of the other thereof is also stopped.

In the automatic transmission 10 having the aforementioned configuration, the first sun gear S1 (more specifically, the rear-side first sun gear S1b) and the fourth sun gear S4 are constantly coupled to each other, the first ring gear R1 and the second sun gear S2 are constantly coupled to each other, the second carrier C2 and the fourth carrier C4 are constantly coupled to each other, and the third carrier C3 and the fourth ring ring gear R4 are constantly coupled to each other. The input shaft 12 is constantly coupled to the first carrier C1, and the output shaft 13 is constantly coupled to the fourth carrier C4. Specifically, the input shaft 12 is coupled to the first carrier C1 via a power transmission member 18 passing between the paired front and rear first sun gears S1a and S1b. The rear-side first sun gear S1b and the fourth sun gear S4 are coupled to each other via a power transmission member 15. The fourth carrier C4 and the second carrier C2 are coupled to each other via a power transmission member 16.

The first clutch CL1 disconnectably connects the input shaft 12 and the first carrier C1 to the third sun gear S3. The second clutch CL2 disconnectably connects the first ring gear R1 and the second sun gear S2 to the third sun gear S3. The third clutch CL3 disconnectably connects the second ring gear R2 to the third sun gear S3.

Specifically, the first clutch CL1 includes an inner holding member rotatably connected to the first carrier C1, a hub-side frictional plate engaged with the outer surface of the inner holding member, an outer holding member rotatably connected to the third sun gear S3 via power transmission members 5 and 8, a drum-side frictional plate engaged with the inner surface of the outer holding member, and a piston P1 projectably and retractably driven in the axis direction for press contact between the hub-side frictional plate and the drum-side frictional plate. A hydraulic chamber F1 for introducing hydraulic oil to be supplied from a valve body VB (see FIG. 1) is defined at a position adjacent to the piston P1. The hub-side frictional plate and the drum-side frictional plate come into press contact, or the press contact is released according to supply or discharge of hydraulic oil to or from the hydraulic chamber F1. Further, the inner holding member and the outer holding member are connected to each other or disconnected from each other when the hub-side frictional plate and the drum-side frictional plate come into press contact, or the press contact is released, whereby the input shaft 12 and the first carrier C1 are disconnectably connected to the third sun gear S3.

The second clutch CL2 includes an inner holding member rotatably connected to the third sun gear S3 via the power transmission members 5 and 8, a hub-side frictional plate engaged with the outer surface of the inner holding member, an outer holding member rotatably connected to the first ring gear R1 and the second sun gear S2 via a power transmission member 7, a drum-side frictional plate engaged with the inner surface of the outer holding member, and a piston P2 projectably and retractably driven in the axis direction for press contact between the hub-side frictional plate and the drum-side frictional plate. A hydraulic chamber F2 for introducing hydraulic oil to be supplied from the valve body VB is defined at a position adjacent to the piston P2. The hub-side frictional plate and the drum-side frictional plate come into press contact, or the press contact is released according to supply or discharge of hydraulic oil to or from the hydraulic chamber F2, whereby, the first ring gear R1 and the second sun gear S2 are disconnectably connected to the third sun gear S3.

The third clutch CL3 includes an inner holding member rotatably connected to the third sun gear S3 via the power transmission members 5 and 8, a hub-side frictional plate engaged with the outer surface of the inner holding member, an outer holding member rotatably connected to the second ring gear R2 via a power transmission member 6, a drum-side frictional plate engaged with the inner surface of the outer holding member, and a piston P3 projectably and retractably driven in the axis direction for press contact between the hub-side frictional plate and the drum-side frictional plate. A hydraulic chamber F3 for introducing hydraulic oil to be supplied from the valve body VB is defined at a position adjacent to the piston P3. The hub-side frictional plate and the drum-side frictional plate come into press contact, or the press contact is released according to supply or discharge of hydraulic oil to or from the hydraulic chamber F3, whereby, the second ring gear R2 and the third sun gear S3 are disconnectably connected to each other.

The first brake BR1 disconnectably connects the first sun gear S1 (more specifically, the front-side first sun gear S1a) to the transmission case 11. The second brake BR2 disconnectably connects the third rig gear R3 to the transmission case 11.

Specifically, the first brake BR1 includes an inner holding member rotatably connected to the front-side first sun gear S1a via a power transmission member 17, a hub-side frictional plate engaged with the outer surface of the inner holding member, an outer holding member non-rotatably connected to the transmission case 11, a drum-side frictional plate engaged with the inner surface of the outer holding member, and a piston P4 projectably and retractably driven in the axis direction for press contact between the hub-side frictional plate and the drum-side frictional plate. A hydraulic chamber F4 for introducing hydraulic oil to be supplied from the valve body VB is defined at a position adjacent to the piston P4. The hub-side frictional plate and the drum-side frictional plate come into press contact, or the press contact is released according to supply or discharge of hydraulic oil to or from the hydraulic chamber F4, whereby, the transmission case 11 and the first sun gear S1 are disconnectably connected to each other.

The second brake BR2 includes an inner holding member rotatably connected to the third sun gear S3, a hub-side frictional plate engaged with the outer surface of the inner holding member, an outer holding member non-rotatably connected to the transmission case 11, a drum-side frictional plate engaged with the inner surface of the outer holding member, and a piston P5 projectably and retractably driven in the axis direction for press contact between the hub-side frictional plate and the drum-side frictional plate. A hydraulic chamber F5 for introducing hydraulic oil to be supplied from the valve body VB is defined at a position adjacent to the piston P5. The hub-side frictional plate and the drum-side frictional plate come into press contact, or the press contact is released according to supply or discharge of hydraulic oil to or from the hydraulic chamber F5, whereby, the transmission case 11 and the third ring gear R3 are disconnectably connected to each other.

The transmission case 11 includes an annular vertical wall portion W1 radially inwardly extending from an inner surface 11b of the transmission case 11 at an axial position between the first brake BR1 and the third clutch CL3, and includes a tubular wall portion W2 of a tubular shape, which extends rearwardly from the inner peripheral end of the vertical wall portion W1. The tubular wall portion W2 is formed to extend concentrically along the inner surface of the power transmission member 8.

Three housings aligned in the axis direction are formed at a position radially outside of the power transmission member 8. The piston P1 of the first clutch CL1, the piston P2 of the second clutch CL2, and the piston P3 of the third clutch CL3 are respectively accommodated in the three housings.

Oil passages for respectively supplying hydraulic oil to the hydraulic chamber F1 of the first clutch CL1, the hydraulic chamber F2 of the second clutch CL2, and the hydraulic chamber F3 of the third clutch CL3 are formed in the vertical wall portion W1, the tubular wall portion W2, and the power transmission member 8. Specifically, an oil passage a is formed in the vertical wall portion W1 and the tubular wall portion W2, and oil passages b, c, and d are formed in the power transmission member 8. Further, hydraulic oil is supplied to the hydraulic chamber F1 of the first clutch CL1 through the oil passage a and the oil passage b. Hydraulic oil is supplied to the hydraulic chamber F2 of the second clutch CL2 through the oil passage a and the oil passage c. Hydraulic oil is supplied to the hydraulic chamber F3 of the third clutch CL3 through the oil passage a and the oil passage d.

Although not illustrated, communication portions between the oil passage a, and the oil passages b, c, and d between the outer surface of the tubular wall portion W2 and the inner surface of the power transmission member 8 are respectively sealed by seal rings.

The piston P4 of the first brake BR1 is accommodated in a housing formed on the front side of the vertical wall portion W1. The hydraulic chamber F4 defined by the housing directly communicates with an oil passage e (see FIG. 2) from the outside of the transmission case 11 (the valve body VB).

The piston P5 of the second brake BR2 is accommodated in a housing formed in the inner surface 11b of a rear portion of the transmission case 11. The hydraulic chamber F5 defined by the housing directly communicates with an oil passage f (see FIG. 2) from the outside of the transmission case 11 (the valve body VB).

According to the automatic transmission 10 of the first embodiment having the aforementioned configuration, as illustrated by the engagement table of FIG. 3, one of first to eighth forward gear positions and a reverse gear position is attained by selective engagement of specific three of the five frictional engagement elements (CL1, CL2, CL3, BR1, and BR2) on the basis of supply/discharge control of hydraulic oil with respect to the hydraulic chambers F1 to F5.

Specifically, the first gear position is attained when the first clutch CL1, the first brake BR1, and the second brake BR2 are engaged; the second gear position is attained when the second clutch CL2, the first brake BR1, and the second brake BR2 are engaged; the third gear position is attained when the first clutch CL1, the second clutch CL2, and the second brake BR2 are engaged; the fourth gear position is attained when the second clutch CL2, the third clutch CL3, and the second brake BR2 are engaged; the fifth gear position is attained when the first clutch CL1, the third clutch CL3, and the second brake BR2 are engaged; the sixth gear position is attained when the first clutch CL1, the second clutch CL2, and the third clutch CL3 are engaged; the seventh gear position is attained when the first clutch CL1, the third clutch CL3, and the first brake BR1 are engaged; the eighth gear position is attained when the second clutch CL2, the third clutch CL3, and the first brake BR1 are engaged; and the reverse gear position is attained when the third clutch CL3, the first brake BR1, and the second brake BR2 are engaged.

Note that "the first gear set PG1", "the fourth gear set PG4", "the second gear set PG2", and "the third gear set PG3" in the first embodiment respectively correspond to "a first planetary gear set", "a second planetary gear set", "a third planetary gear set", and "a fourth planetary gear set" in the claims. Further, "the first sun gear S1, the first carrier C1, and the first ring gear R1" in the first embodiment correspond to "a first sun gear, a first carrier, and a first ring gear" in the claims; "the fourth sun gear S4, the fourth carrier C4, and the fourth ring gear R4" in the first embodiment correspond to "a second sun gear, a second carrier, and a second ring gear" in the claims; "the second sun gear S2, the second carrier C2, and the second ring gear R2" in the first embodiment correspond to "a third sun gear, a third carrier, and a third ring gear" in the claims; and "the third sun gear S3, the third carrier C3, and the third ring gear R3" in the first embodiment correspond to "a fourth sun gear, a fourth carrier, and a fourth ring gear" in the claims. Further, "the front-side first sun gear S1$a$" and "the rear-side first sun gear S1$b$" in the first embodiment respectively correspond to "a first split sun gear" and "a second split sun gear" in the claims. The correlations between these elements are the same in the other embodiments to be described later.

Figure 4:
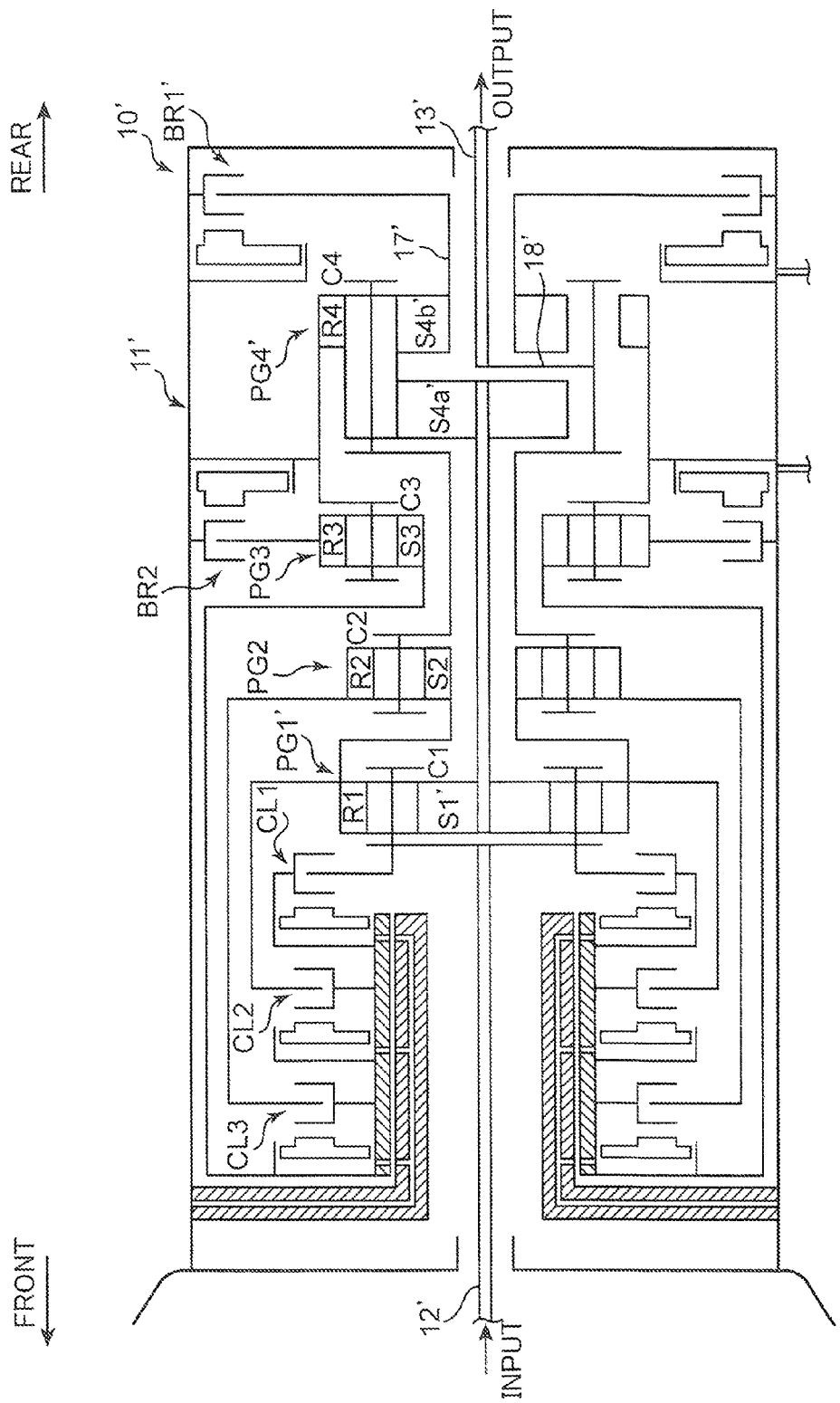
FIG. 4 is a conceptual diagram of an automatic transmission according to a comparative example.

In this example, advantages of the automatic transmission 10 are described by comparing the automatic transmission 10 according to the first embodiment illustrated in FIG. 1 and FIG. 2 with an automatic transmission 10' according to a comparative example illustrated in FIG. 4. Note that in the following description, regarding constituent elements such as gear sets and frictional engagement elements, constituent elements common to those in the first embodiment are indicated with the same reference numerals, and constituent elements having the same functions as those in the first embodiment but whose arrangement position or structure is different from the arrangement position or the structure in the first embodiment are indicated with the same reference numerals attached with a suffix (').

Figure 12:
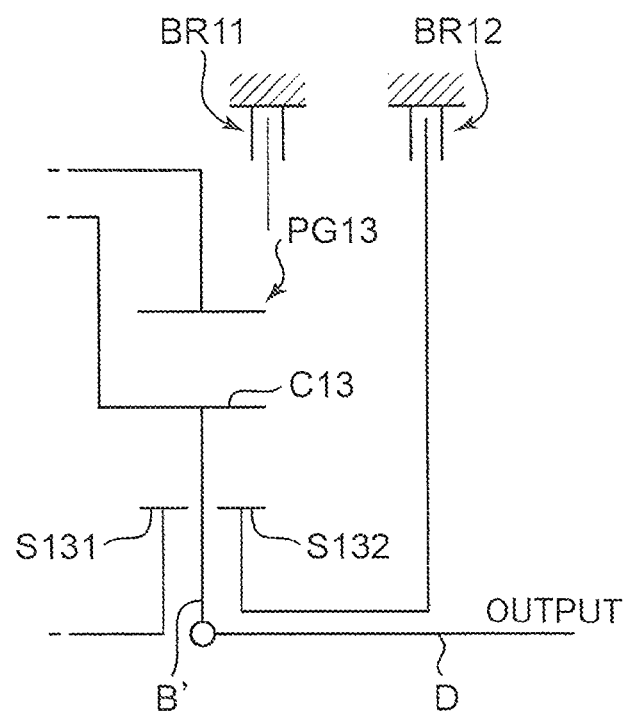
FIG. 12 is a conceptual diagram illustrating a state that the automatic transmission illustrated in FIG. 11 is changed to a longitudinally disposed automatic transmission.

The automatic transmission 10' illustrated in FIG. 4 is a device in which the conventional art described referring to FIG. 12 is simply applied. Specifically, the automatic transmission 10' is a device, in which a fourth gear set PG4' disposed on the rearmost side (the side opposite to the drive source) is configured as a double sun gear type gear set, a fourth carrier C4 of the fourth planetary gear set PG4' is coupled to an output shaft 13' disposed coaxially with an input shaft 12' in order to use a transversely disposed automatic transmission as a longitudinally disposed automatic transmission.

Therefore, the automatic transmission 10' illustrated in FIG. 4 is different from the automatic transmission 10 illustrated in FIG. 1 and FIG. 2 in a point that the fourth gear set PG4' is a double sun gear type gear set in place of a first gear set PG1', and in a point that a first brake BR1' is disposed on the rearmost side (on the side opposite to the drive source) and is coupled to a sun gear (more specifically, a rear-side fourth sun gear S4$b$') of the fourth gear set PG4' in place of the first gear set PG1'. The automatic transmission 10' is substantially the same as the automatic transmission 10 in the other configuration.

As illustrated in FIG. 4, the fourth gear set PG4' includes a front-side fourth sun gear S4$a$' and the rear-side fourth sun gear S4$b$' split into front and rear parts. An inner holding member of the first brake BR1' is coupled to the rear-side fourth sun gear S4$b$' via a power transmission member 17'. Further, the output shaft 13' passes through (the center portion of) the front-side fourth sun gear S4$a$', and is coupled to a fourth carrier C4 via a power transmission member 18' passing between the paired fourth sun gears S4$a$' and S4$b$'.

In this way, in the case of the automatic transmission 10' illustrated in FIG. 4, the output shaft 13' passes through the rear-side fourth sun gear S4$b$' of the fourth gear set PG4'. However, it is necessary to make the diameter of the output shaft 13' large, as compared with the input shaft 12' in view of the necessity of transmitting a torque, which is larger than an input torque by the amount corresponding to a maximum speed reduction ratio. This may make the diameter of the rear-side fourth sun gear S4$b$' large, and the overall diameter of the fourth gear set PG4' may increase accordingly.

On the other hand, in the automatic transmission 10 of the first embodiment using the first gear set PG1 of a double sun gear type, as illustrated in FIG. 1 and FIG. 2, the input shaft 12 passes through (the center portion of) the front-side first sun gear S1$a$ of the first gear set PG1, and the output shaft 13 is constantly connected to the fourth carrier C4 of the fourth gear set PG4. Therefore, it is possible to avoid an increase in the diameter of a planetary gear set by a configuration, in which the output shaft 13 whose diameter is made large for transmission of a large torque passes through the center portion of a split sun gear. This makes it possible to reduce the diameter of a portion of the transmission case 11 surrounding the fourth gear set PG4 to form a reduced diameter portion 11$x$, as illustrated in FIG. 1 and FIG. 2. Thus, it is possible to reduce the diameter of an end portion of the automatic transmission 10 on the output side, as compared with a case, in which the configuration of the comparative example illustrated in FIG. 4 is employed (a transmission case in this case is illustrated by the two-dotted chain line L in FIG. 2). In this way, it is possible to improve the seating comfort on a driver's seat and a passenger's seat.

Further, in the first embodiment, the input shaft 12 passes through the split sun gear S1$a$. However, a transmission torque of the input shaft 12 is small, as compared with the output shaft 13. Therefore, it is possible to make the input shaft 12 small. Thus, it is possible to make an increase in the diameter of the first gear set PG1 small, and to suppress an increase in the dimeter of the automatic transmission 10 on the input side.

Figure 5:
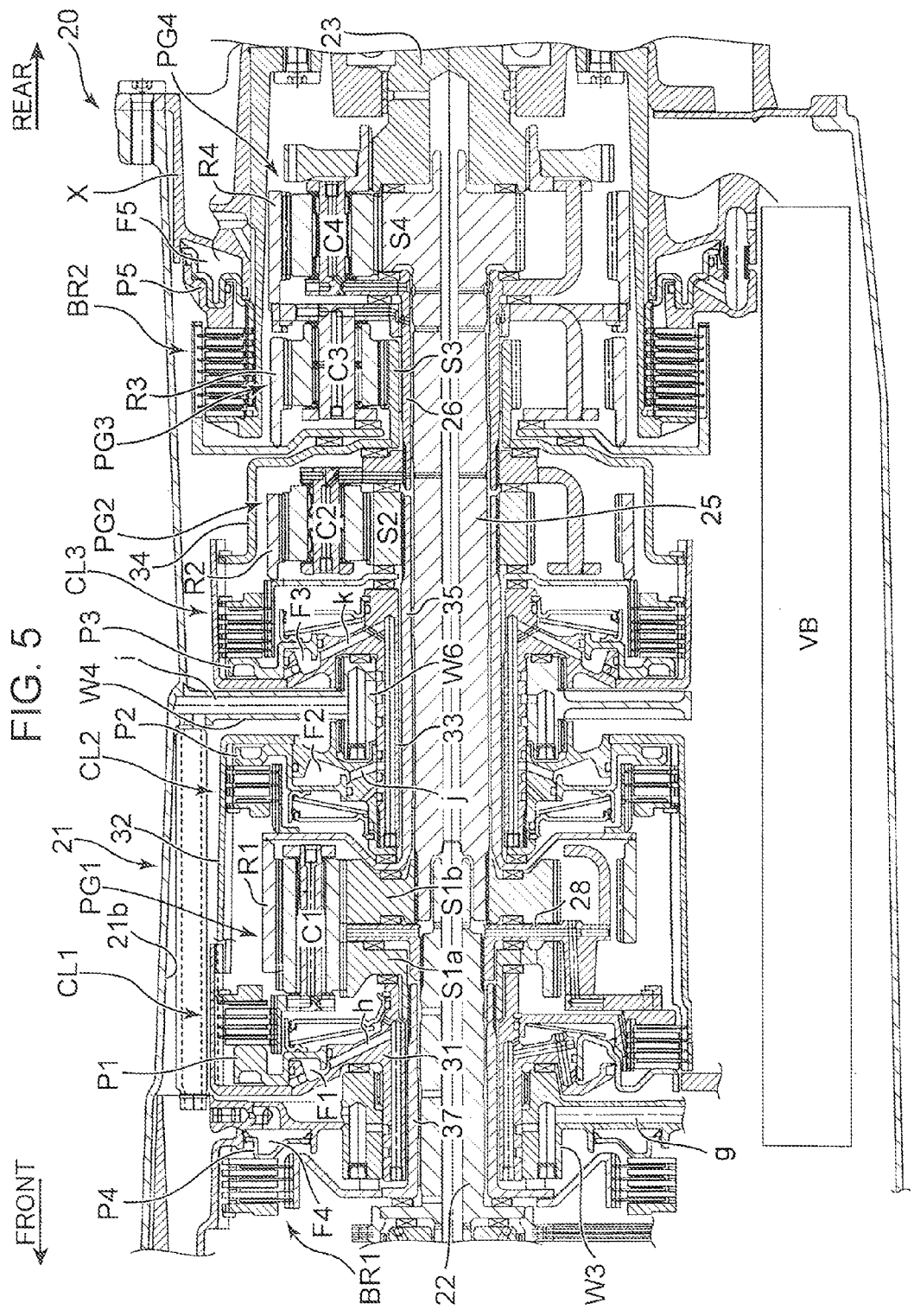
FIG. 5 is a sectional view of an automatic transmission according to a second embodiment of the present invention.
Figure 6:
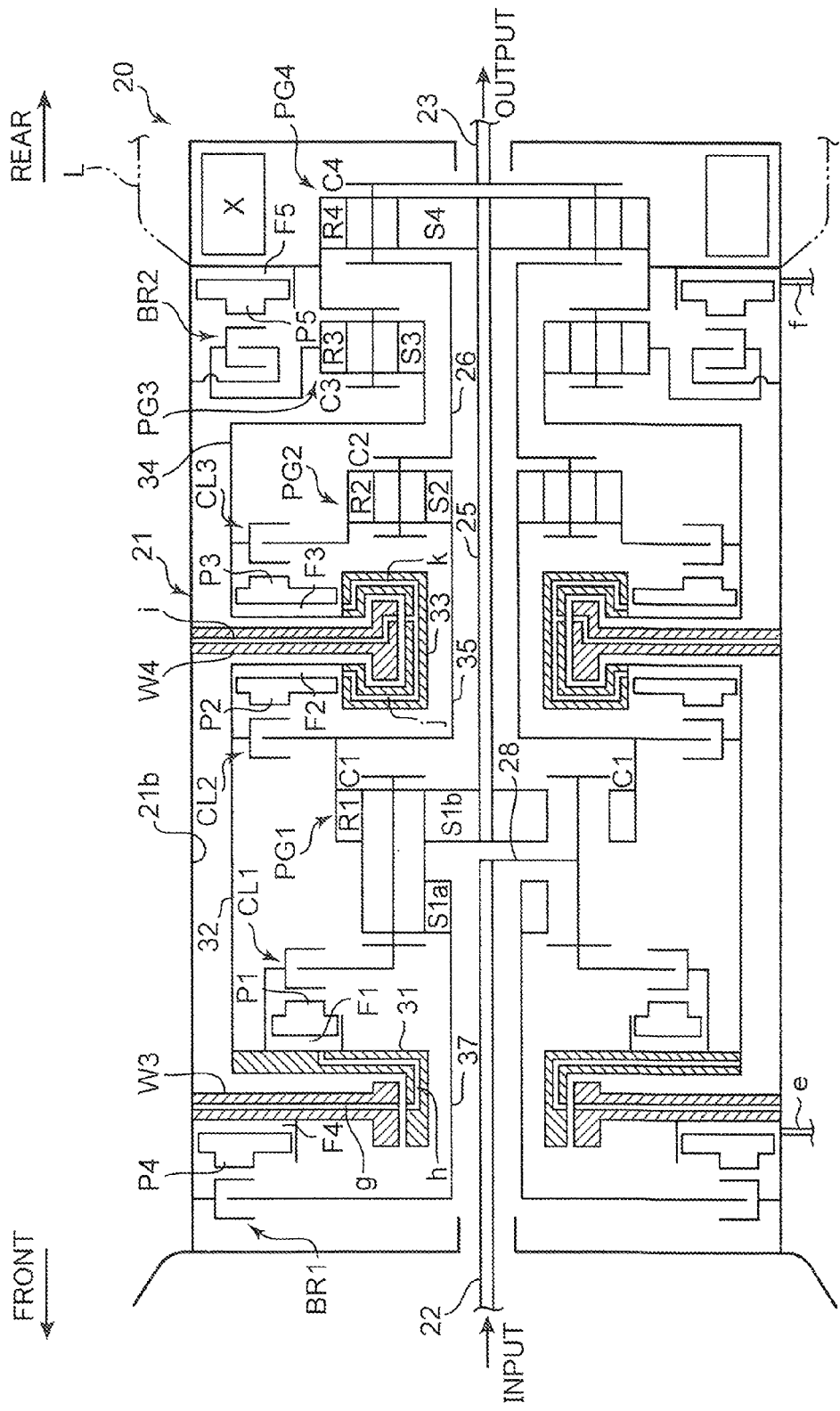
FIG. 6 is a conceptual diagram of the automatic transmission according to the second embodiment.

FIG. 5 and FIG. 6 are a sectional view and a conceptual diagram illustrating a configuration of an automatic transmission 20 according to a second embodiment of the present invention. Note that in the following description, constituent elements such as gear sets and frictional engagement elements are indicated with the same reference numerals as used in the first embodiment. The same idea is applied to third to fifth embodiments to be described later.

The automatic transmission 20 of the second embodiment is a longitudinally disposed automatic transmission as well as the first embodiment. The automatic transmission 20 includes a transmission case 21, an input shaft 22 received from the vehicle front side (the drive source side) to the inside of the transmission case 21, and an output shaft 23 projecting from the inside of the transmission case 21 to the vehicle rear side (the side opposite to the drive source). The input shaft 22 and the output shaft 23 are coaxially disposed. A first gear set PG1, a second gear set PG2, a third gear set PG3, and a fourth gear set PG4 are disposed in this order from the front side on the axes of the input shaft 22 and the output shaft 23.

Within the transmission case 21, a first clutch CL1 is disposed on the front side of the first gear set PG1, a second clutch CL2 is disposed on the rear side of the first gear set PG1, and a third clutch CL3 is disposed between the second clutch CL2 and the second gear set PG2. Further, a first brake BR1 is disposed on the front side of the first clutch CL3. A second brake BR2 is disposed radially outside of the third gear set PG3. In this way, frictional engagement elements of the automatic transmission 10 (the first to third clutches CL1 to CL3, and the first and second brakes BR1 and BR2) are disposed in the axis direction in the order of the first brake BR1, the first clutch CL1, the second clutch CL2, the third clutch CL3, and the second brake BR2 from the front side (the drive source side).

The first to fourth gear sets PG1 to PG4 are each a planetary gear set of a single pinion type as well as the first embodiment. The first gear set PG1 includes a first sun gear S1, a first ring gear R1, and a first carrier C1. The second gear set PG2 includes, a second sun gear S2, a second ring gear R2, and a second carrier C2. The third gear set PG3 includes a third sun gear S3, a third ring gear R3, and a third carrier C3. The fourth gear set PG4 includes a fourth sun gear S4, a fourth ring gear R4, and a fourth carrier C4.

The first gear set PG1 is a double sun gear type gear set as well as the first embodiment. Specifically, the first sun gear S1 includes a front-side first sun gear S1$a$ and a rear-side first sun gear S1$b$ split in the axis direction.

In the automatic transmission 20, the first sun gear S1 (more specifically, the rear-side firs sun gear S1$b$) and the fourth sun gear S4 are constantly coupled to each other, the first ring gear R1 and the second sun gear S2 are constantly coupled to each other, the second carrier C2 and the fourth carrier C4 are constantly coupled to each other, and the third carrier C3 and the fourth ring gear R4 are constantly coupled to each other. The input shaft 22 is constantly coupled to the first carrier C1, and the output shaft 13 is constantly coupled to the fourth carrier C4. Specifically, the input shaft 12 is coupled to the first carrier C1 via a power transmission member 28 passing between the paired front and rear first sun gears S1$a$ and S1$b$. The rear-side first sun gear S1$b$ and the fourth sun gear S4 are coupled to each other via a power transmission member 25. The fourth carrier C4 and the second carrier C2 are coupled to each other via a power transmission member 26.

The first clutch CL1 disconnectably connects the input shaft 22 and the first carrier C1 to the third sun gear S3. The second clutch CL2 disconnectably connects the first ring gear R1 and the second sun gear S2 to the third sun gear S3. The third clutch CL3 disconnectably connects the second ring gear R2 to the third sun gear S3.

Specifically, the first clutch CL1 includes an inner holding member rotatably connected to the first carrier C1, a hub-side frictional plate engaged with the outer surface of the inner holding member, an outer holding member rotatably connected to the third sun gear S3 via power transmission members 31, 32, 33, and 34, a drum-side frictional plate engaged with the inner surface of the outer holding member, and a piston P1 projectably and retractably driven in the axis direction for press contact between the hub-side frictional plate and the drum-side frictional plate. A hydraulic chamber F1 for introducing hydraulic oil to be supplied from a valve body VB (see FIG. 5) is defined at a position adjacent to the piston P1. The hub-side frictional plate and the drum-side frictional plate come into press contact, or the press contact is released according to supply or discharge of hydraulic oil to or from the hydraulic chamber F1, whereby the input shaft 22 and the first carrier C1 are disconnectably connected to the third sun gear S3.

The second clutch CL2 includes an inner holding member rotatably connected to the first ring gear R1 and the second sun gear S2 via a power transmission member 35, a hub-side frictional plate engaged with the outer surface of the inner holding member, an outer holding member rotatably connected to the third sun gear S3 via the power transmission members 32, 33, and 34, a drum-side frictional plate engaged with the inner surface of the outer holding member, and a piston P2 projectably and retractably driven in the axis direction for press contact between the hub-side frictional plate and the drum-side frictional plate. A hydraulic chamber F2 for introducing hydraulic oil to be supplied from the valve body VB is defined at a position adjacent to the piston P2. The hub-side frictional plate and the drum-side frictional plate come into press contact, or the press contact is released according to supply or discharge of hydraulic oil to or from the hydraulic chamber F2, whereby the first ring gear R1 and the second sun gear S2 are disconnectably connected to the third sun gear S3.

The third clutch CL3 includes an inner holding member rotatably connected to the second ring gear R2, a hub-side frictional plate engaged with the outer surface of the inner holding member, an outer holding member rotatably connected to the third sun gear S3 via the power transmission member 34, a drum-side frictional plate engaged with the inner surface of the outer holding member, and a piston P3 projectably and retractably driven in the axis direction for press contact between the hub-side frictional plate and the drum-side frictional plate. A hydraulic chamber F3 for introducing hydraulic oil to be supplied from the valve body VB is defined at a position adjacent to the piston P3. The hub-side frictional plate and the drum-side frictional plate come into press contact, or the press contact is released according to supply or discharge of hydraulic oil to or from the hydraulic chamber F3, whereby the second ring gear R2 and the third sun gear S3 are disconnectably connected to each other.

The first brake BR1 disconnectably connects the first sun gear S1 (more specifically, the front-side first sun gear S1$a$)

to the transmission case 21. The second brake BR2 disconnectably connects the third rig gear R3 to the transmission case 21.

Specifically, the first brake BR1 includes an inner holding member rotatably connected to the front-side first sun gear S1a via a power transmission member 37, a hub-side frictional plate engaged with the outer surface of the inner holding member, an outer holding member non-rotatably connected to the transmission case 21, a drum-side frictional plate engaged with the inner surface of the outer holding member, and a piston P4 projectably and retractably driven in the axis direction for press contact between the hub-side frictional plate and the drum-side frictional plate. A hydraulic chamber F4 for introducing hydraulic oil to be supplied from the valve body VB is defined at a position adjacent to the piston P4. The hub-side frictional plate and the drum-side frictional plate come into press contact, or the press contact is released according to supply or discharge of hydraulic oil to or from the hydraulic chamber F4, whereby the transmission case 21 and the first sun gear S1 are disconnectably connected to each other.

The second brake BR2 includes an inner holding member non-rotatably connected to the transmission case 21, a hub-side frictional plate engaged with the outer surface of the inner holding member, an outer holding member rotatably connected to the third ring gear R3, a drum-side frictional plate engaged with the inner surface of the outer holding member, and a piston P5 projectably and retractably driven in the axis direction for press contact between the hub-side frictional plate and the drum-side frictional plate. A hydraulic chamber F5 for introducing hydraulic oil to be supplied from the valve body VB is defined at a position adjacent to the piston P5. The hub-side frictional plate and the drum-side frictional plate come into press contact, or the press contact is released according to supply or discharge of hydraulic oil to or from the hydraulic chamber F5, whereby, the transmission case 21 and the third ring gear R3 are disconnectably connected to each other.

The transmission case 21 includes a vertical front wall portion W3 of a T-shape in section, which extends radially inwardly from an inner surface 21b of the transmission case 21 at an axial position between the first brake BR1 and the first clutch CL1. The inner peripheral end of the vertical front wall portion W3 is formed to extend in the front-rear direction along the outer surface of the power transmission member 31.

Further, the transmission case 21 includes an intermediate vertical wall portion W4 of a T-shape in section, which extends radially inwardly from the inner surface 21b of the transmission case 21 at an axial position between the second clutch CL2 and the third clutch CL3. The inner peripheral end of the intermediate vertical wall portion W4 is formed to extend in the front-rear direction along the power transmission member 33 at a position surrounded by the power transmission member 33 radially inwardly and outwardly.

The piston P1 of the first clutch CL1 is accommodated in a housing integrally formed with the power transmission members 31 and 32. Oil passages for supplying hydraulic oil to the hydraulic chamber F1 defined by the housing are formed in the vertical front wall portion W3 and the power transmission member 31. Specifically, an oil passage g is formed in the vertical front wall portion W3, and an oil passage h is formed in the power transmission member 31. Further, hydraulic oil is supplied to the hydraulic chamber F1 of the first clutch CL1 through the oil passage g and the oil passage h.

The piston P2 of the second clutch CL2 is accommodated in a housing integrally formed with the power transmission members 32 and 33. Likewise, the piston P3 of the third clutch CL3 is accommodated in a housing integrally formed with the power transmission members 33 and 34. Oil passages for supplying hydraulic oil to the hydraulic chambers F2 and F3 defined by these housings are formed in the intermediate vertical wall portion W4 and the power transmission member 33. Specifically, an oil passage i is formed in the intermediate vertical wall portion W4, and oil passages j and k are formed in the power transmission member 33. Further, hydraulic oil is supplied to the hydraulic chamber F2 of the second clutch CL2 through the oil passage i and the oil passage j, and hydraulic oil is supplied to the hydraulic chamber F3 of the third clutch CL3 through the oil passage i and the oil passage k.

The piston P4 of the first brake BR1 is accommodated in a housing formed on the front side of the vertical front wall portion W3. The hydraulic chamber F4 defined by the housing directly communicates with the oil passage e (see FIG. 6) from the outside of the transmission case 21 (the valve body VB).

The piston P5 of the second brake BR2 is accommodated in a housing, which is received from the rear side and fixed inside the rear end of the transmission case 21. The hydraulic chamber F5 defined by the housing directly communicates with the oil passage f from the outside of the transmission case 21 (the valve body VB).

According to the automatic transmission 20 of the second embodiment having the aforementioned configuration, as illustrated by the engagement table of FIG. 3 as well as the first embodiment, one of first to eighth forward gear positions and one reverse gear position is attained by selective engagement of specific three of the five frictional engagement elements (CL1, CL2, CL3, BR1, and BR2) on the basis of supply/discharge control of hydraulic oil with respect to the hydraulic chambers F1 to F5.

Further, according to the automatic transmission 20 of the second embodiment, as well as the automatic transmission 10 of the first embodiment, the input shaft 22 passes through (the center portion of) the front-side first sun gear S1a of the first gear set PG1 of a double sun gear type, and the output shaft 23 is constantly coupled to the fourth gear set PG4. Therefore, it is possible to avoid an increase in the diameter of a planetary gear set by a configuration, in which the output shaft 23 whose diameter is made large for transmission of a large torque passes through a split sun gear. This makes it possible to reduce the diameter of an end portion of the automatic transmission 20 on the output side (on the rear side), and to improve the seating comfort on a driver's seat and a passenger's seat. Note that in the second embodiment, a component X for holding a housing of the second brake BR2 is disposed radially outside of the fourth gear set PG4. Therefore, unlike the configuration of the first embodiment, it is not possible to reduce the diameter of a portion of the transmission case 21 surrounding the fourth gear set PG4. However, when the fourth gear set PG4 is configured as a double sun gear type gear set, the diameter of a rear portion of the transmission case 21 is further increased (a transmission case in this case is illustrated by a two-dotted chain line L in FIG. 6). As compared with this case, the second embodiment is advantageous in miniaturizing the automatic transmission.

Figure 7:
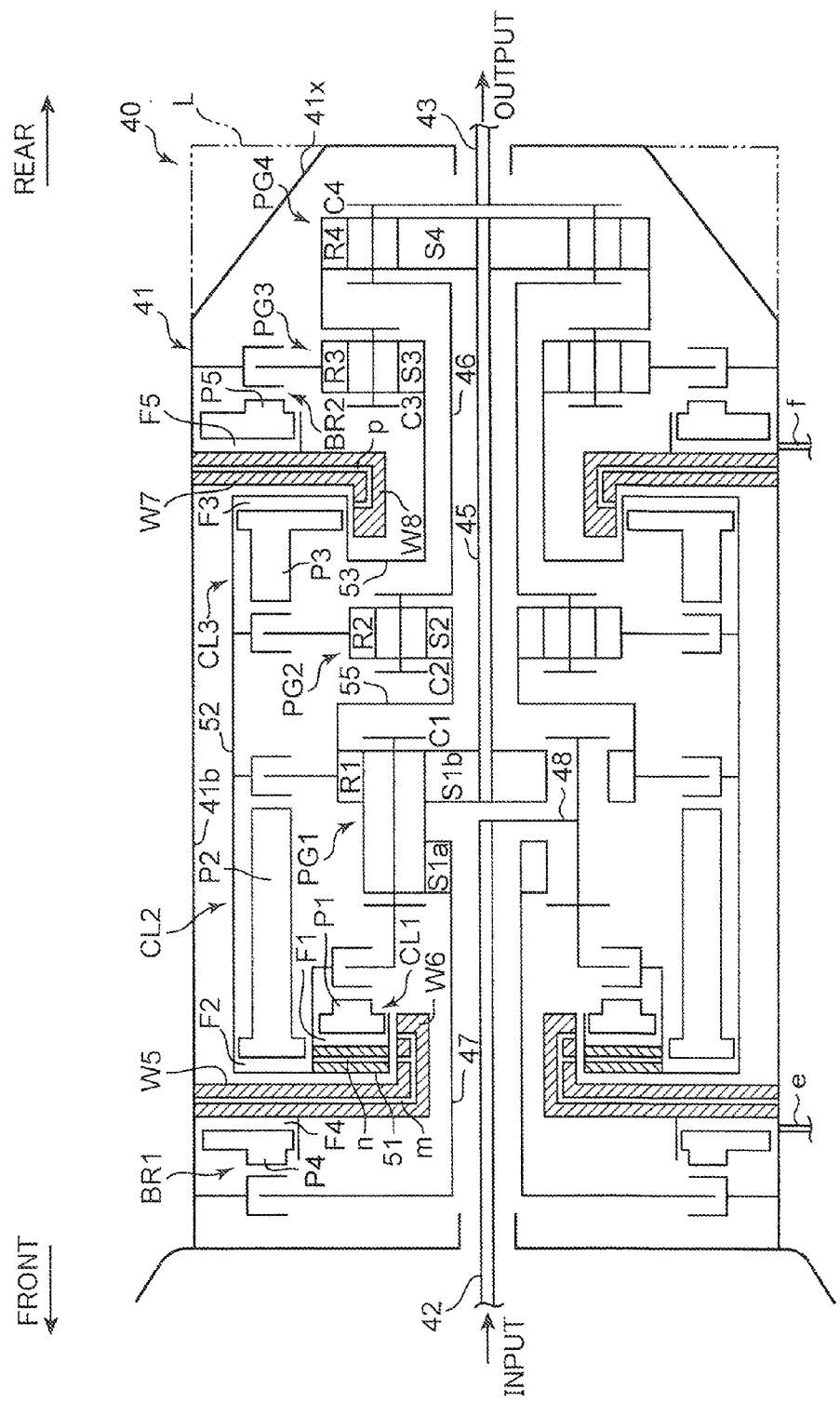
FIG. 7 is a conceptual diagram of an automatic transmission according to a third embodiment of the present invention.

FIG. 7 is a conceptual diagram illustrating a configuration of an automatic transmission 40 according to a third embodiment of the present invention. The automatic transmission 40 is a longitudinally disposed automatic transmission as well as the first embodiment. The automatic transmission 40 includes a transmission case 41, an input shaft 42 received from the vehicle front side (the drive source side) to the inside of the transmission case 41, and an output shaft 43 projecting from the inside of the transmission case 41 to the vehicle rear side (the side opposite to the drive source). The input shaft 42 and the output shaft 43 are coaxially disposed. A first gear set PG1, a second gear set PG2, a third gear set PG3, and a fourth gear set PG4 are disposed in this order from the front side on the axes of the input shaft 42 and the output shaft 43.

Within the transmission case 41, a first clutch CL1 is disposed on the front side of the first gear set PG1, a second clutch CL2 is disposed radially outside of the first clutch CL1 and the first gear set PG1, and a third clutch CL3 is disposed radially outside of the second gear set PG2. Further, a first brake BR1 is disposed on the front side of the first clutch CL1 and the second clutch CL2. A second brake BR2 is disposed radially outside of the third gear set PG3. In this way, frictional engagement elements of the automatic transmission 40 (the first to third clutches CL1 to CL3, and the first and second brakes BR1 and BR2) are disposed in the axis direction from the front side (the drive source side) in the order of the first brake BR1, the first clutch CL1 (or the second clutch CL2), the third clutch CL3, and the second brake BR2.

The first to fourth gear sets PG1 to PG4 are each a planetary gear set of a single pinion type as well as the first embodiment. The first gear set PG1 includes a first sun gear S1, a first ring gear R1, and a first carrier C1. The second gear set PG2 includes a second sun gear S2, a second ring gear R2, and a second carrier C2. The third gear set PG3 includes a third sun gear S3, a third ring gear R3, and a third carrier C3. The fourth gear set PG4 includes a fourth sun gear S4, a fourth ring gear R4, and a fourth carrier C4.

The first gear set PG1 is a double sun gear type gear set as well as the first embodiment. Specifically, the first sun gear S1 includes a front-side first sun gear S1a and a rear-side first sun gear S1b split in the axis direction.

In the automatic transmission 40, the first sun gear S1 (more specifically, the rear-side firs sun gear S1b) and the fourth sun gear S4 are constantly coupled to each other, the first ring gear R1 and the second sun gear S2 are constantly coupled to each other, the second carrier C2 and the fourth carrier C4 are constantly coupled to each other, and the third carrier C3 and the fourth ring gear R4 are constantly coupled to each other. The input shaft 42 is constantly coupled to the first carrier C1, and the output shaft 13 is constantly coupled to the fourth carrier C4. Specifically, the input shaft 42 is coupled to the first carrier C1 via a power transmission member 48 passing between the paired front and rear first sun gears S1a and S1b. The rear-side first sun gear S1b and the fourth sun gear S4 are coupled to each other via a power transmission member 45. The fourth carrier C4 and the second carrier C2 are coupled to each other via a power transmission member 46.

The first clutch CL1 disconnectably connects the input shaft 42 and the first carrier C1 to the third sun gear S3. The second clutch CL2 disconnectably connects the first ring gear R1 and the second sun gear S2 to the third sun gear S3. The third clutch CL3 disconnectably connects the second ring gear R2 to the third sun gear S3.

Specifically, the first clutch CL1 includes an inner holding member rotatably connected to the third sun gear S3 via power transmission members 51, 52, and 53, a hub-side frictional plate engaged with the outer surface of the inner holding member, an outer holding member rotatably connected to the first carrier C1, a drum-side frictional plate engaged with the inner surface of the outer holding member, and a piston P1 projectably and retractably driven in the axis direction for press contact between the hub-side frictional plate and the drum-side frictional plate. A hydraulic chamber F1 for introducing hydraulic oil to be supplied from an unillustrated valve body is defined at a position adjacent to the piston P1. The hub-side frictional plate and the drum-side frictional plate come into press contact, or the press contact is released according to supply or discharge of hydraulic oil to or from the hydraulic chamber F1, whereby the input shaft 42 and the first carrier C1 are disconnectably connected to the third sun gear S3.

The second clutch CL2 includes an inner holding member rotatably connected to the first ring gear R1 and the second sun gear S2 via a power transmission member 55, a hub-side frictional plate engaged with the outer surface of the inner holding member, an outer holding member rotatably connected to the third sun gear S3 via the power transmission members 52 and 53, a drum-side frictional plate engaged with the inner surface of the outer holding member, and a piston P2 projectably and retractably driven in the axis direction for press contact between the hub-side frictional plate and the drum-side frictional plate. A hydraulic chamber F2 for introducing hydraulic oil to be supplied from the valve body is defined at a position adjacent to the piston P2. The hub-side frictional plate and the drum-side frictional plate come into press contact, or the press contact is released according to supply or discharge of hydraulic oil to or from the hydraulic chamber F2, whereby the first ring gear R1 and the second sun gear S2 are disconnectably connected to the third sun gear S3.

The third clutch CL3 includes an inner holding member rotatably connected to the second ring gear R2, a hub-side frictional plate engaged with the outer surface of the inner holding member, an outer holding member rotatably connected to the third sun gear S3 via the power transmission member 53, a drum-side frictional plate engaged with the inner surface of the outer holding member, and a piston P3 projectably and retractably driven in the axis direction for press contact between the hub-side frictional plate and the drum-side frictional plate. A hydraulic chamber F3 for introducing hydraulic oil to be supplied from the valve body is defined at a position adjacent to the piston P3. The hub-side frictional plate and the drum-side frictional plate come into press contact, or the press contact is released according to supply or discharge of hydraulic oil to or from the hydraulic chamber F3, whereby the second ring gear R2 and the third sun gear S3 are disconnectably connected to each other.

In this way, in each of the first to third clutches CL1 to CL3, one of a pair of inner and outer holding members to be disconnectably connected to each other via a frictional plate is coupled to the third sun gear S3 via the common power transmission member 52. In view of this, in the third embodiment, outer holding members of a plurality of clutches are integrally formed on the common power transmission member 52.

Further, in the third embodiment, a counterpart member to be connected to the inner holding member of each of the first to third clutches CL1 to CL3 is a rotary element of a gear set (the first gear set PG1 or the second gear set PG2), which is located radially inwardly of each of the first to third clutches CL1 to CL3. Both of the power transmission member 45 which connects between the rear-side first sun gear S1b and the fourth sun gear S4, and the power transmission member 46 which connects between the second carrier C2 and the fourth carrier C4 are disposed in such a manner as to pass through the power transmission member 53 which connects between the third sun gear S3 and the power transmission member 52.

Therefore, in the third embodiment, as illustrated in FIG. 7, it is not necessary to provide another power transmission member or the like between the power transmission member 52 and an inner surface 41b of the transmission case 41. This makes it possible to dispose the power transmission member 52 at such a position as to directly face the inner surface 41b of the transmission case 41. In other words, in the third embodiment, any component (e.g. a planetary gear set or another power transmission member) surrounding the first to third clutches CL1 to CL3 does not exist other than the power transmission member 52. Therefore, it is easy to accommodate the first to third clutches CL1 to CL3 within the transmission case 41.

The first brake BR1 disconnectably connects the first sun gear S1 (more specifically, the front-side first sun gear S1a) to the transmission case 41. The second brake BR2 disconnectably connects the third ring gear R3 to the transmission case 41.

Specifically, the first brake BR1 includes an inner holding member rotatably connected to the front-side first sun gear S1a via a power transmission member 47, a hub-side frictional plate engaged with the outer surface of the inner holding member, an outer holding member non-rotatably connected to the transmission case 41, a drum-side frictional plate engaged with the inner surface of the outer holding member, and a piston P4 projectably and retractably driven in the axis direction for press contact between the hub-side frictional plate and the drum-side frictional plate. A hydraulic chamber F4 for introducing hydraulic oil to be supplied from the valve body is defined at a position adjacent to the piston P4. The hub-side frictional plate and the drum-side frictional plate come into press contact, or the press contact is released according to supply or discharge of hydraulic oil to or from the hydraulic chamber F4, whereby the transmission case 41 and the first sun gear S1 are disconnectably connected to each other.

The second brake BR2 includes an inner holding member rotatably connected to the third ring gear R3, a hub-side frictional plate engaged with the outer surface of the inner holding member, an outer holding member non-rotatably connected to the transmission case 41, a drum-side frictional plate engaged with the inner surface of the outer holding member, and a piston P5 projectably and retractably driven in the axis direction for press contact between the hub-side frictional plate and the drum-side frictional plate. A hydraulic chamber F5 for introducing hydraulic oil to be supplied from the valve body is defined at a position adjacent to the piston P5. The hub-side frictional plate and the drum-side frictional plate come into press contact, or the press contact is released according to supply or discharge of hydraulic oil to or from the hydraulic chamber F5, whereby the transmission case 41 and the third ring gear R3 are disconnectably connected to each other.

The transmission case 41 includes an annular vertical front wall portion W5 extending radially inwardly from the inner surface 41b of the transmission case 41 at an axial position between the first brake BR1, and the first and second clutches CL1 and CL2, and includes a tubular front wall portion W6 of a tubular shape, which extends rearwardly from the inner peripheral end of the vertical front wall portion W5.

Further, the transmission case 41 includes an annular intermediate vertical wall portion W7 extending radially inwardly from the inner surface 41b of the transmission case 41 at an axial position between the third clutch CL3 and the second brake BR2, and includes an intermediate tubular wall portion W8 of a tubular shape, which extends forwardly from the inner peripheral end of the intermediate vertical wall portion W7.

The piston P1 of the first clutch CL1 is accommodated in a housing, which is formed to extend rearwardly from the vertical front wall portion W5 at a position radially outside of the tubular front wall portion W6. An oil passage m for supplying hydraulic oil to the hydraulic chamber F1 defined by the housing is formed in the vertical front wall portion W5 and the tubular front wall portion W6.

The piston P2 of the second clutch CL2 is accommodated in a housing, which is formed to extend rearwardly from the vertical front wall portion W5 at a position radially outside of the first clutch CL1. An oil passage n communicating with the hydraulic chamber F2 defined by the housing is formed in the power transmission member 51. Specifically, hydraulic oil is supplied to the hydraulic chamber F2 through the oil passage m formed in the vertical front wall portion W5 and the tubular front wall portion W6, and through the oil passage n formed in the power transmission member 51. A housing of the first clutch CL1 and a housing of the second clutch CL2 are integrally formed with a positional relationship such that a double layer structure is constituted by an inner layer and an outer layer.

The piston P3 of the third clutch CL3 is accommodated in a housing, which is formed to extend forwardly from the intermediate vertical wall portion W7 at a position radially outside of the intermediate tubular wall portion W8. An oil passage p for supplying hydraulic oil to the hydraulic chamber F3 defined by the housing is formed in the intermediate vertical wall portion W7 and the intermediate tubular wall portion W8.

The piston P4 of the first brake BR1 is accommodated in a housing, which is formed to extend forwardly from the vertical front wall portion W5. The hydraulic chamber F4 defined by the housing directly communicates with an oil passage e from the outside of the transmission case 41.

The piston P5 of the second brake BR2 is accommodated in a housing, which is formed to extend rearwardly from the intermediate vertical wall portion W7. The hydraulic chamber F5 defined by the housing directly communicates with an oil passage f from the outside of the transmission case 41.

Although not illustrated, communication portions of the oil passages m, n, and p between the outer surfaces of the tubular wall portions W6 and W8, and the inner surfaces of the housings of the first clutch CL1 and the third clutch CL3 are respectively sealed by seal rings.

According to the automatic transmission 40 of the third embodiment having the aforementioned configuration, as illustrated by the engagement table of FIG. 3 as well as the first embodiment, one of first to eighth forward gear positions and one reverse gear position is attained by selective engagement of specific three of the five frictional engagement elements (CL1, CL2, CL3, BR1, and BR2) on the basis of supply/discharge control of hydraulic oil with respect to the hydraulic chambers F1 to F5.

Further, according to the automatic transmission 40 of the third embodiment, as well as the automatic transmission 10 of the first embodiment, the input shaft 42 passes through (the center portion of) the front-side first sun gear S1a of the first gear set PG1 of a double sun gear type, and the output shaft 43 is constantly coupled to the fourth gear set PG4. Therefore, it is possible to avoid an increase in the diameter of a planetary gear set by a configuration, in which the output shaft 43 whose diameter is made large for transmission of a large torque passes through a split sun gear. This makes it possible to reduce the diameter of a portion of the transmission case 41 surrounding the fourth gear set PG4 to form a reduced diameter portion 41x. This is advantageous in reducing the diameter of an end portion of the automatic transmission 40 on the output side (on the rear side), as compared with a case in which the fourth gear set PG4 is configured as a double sun gear type gear set (a transmission case in this case is illustrated by a two-dotted chain line L in FIG. 7).

Figure 8:
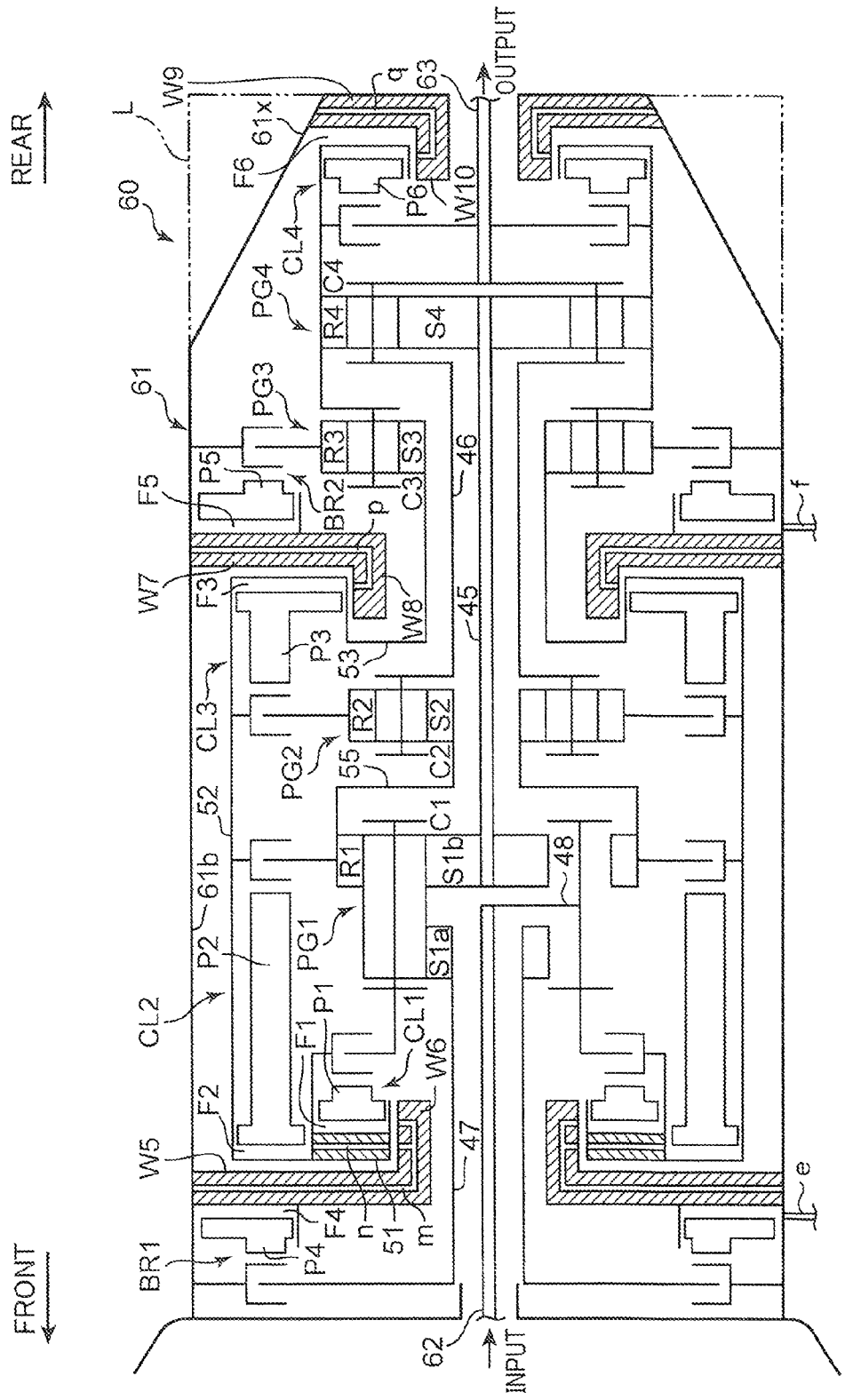
FIG. 8 is a conceptual diagram of an automatic transmission according to a fourth embodiment of the present invention.
Figure 9:
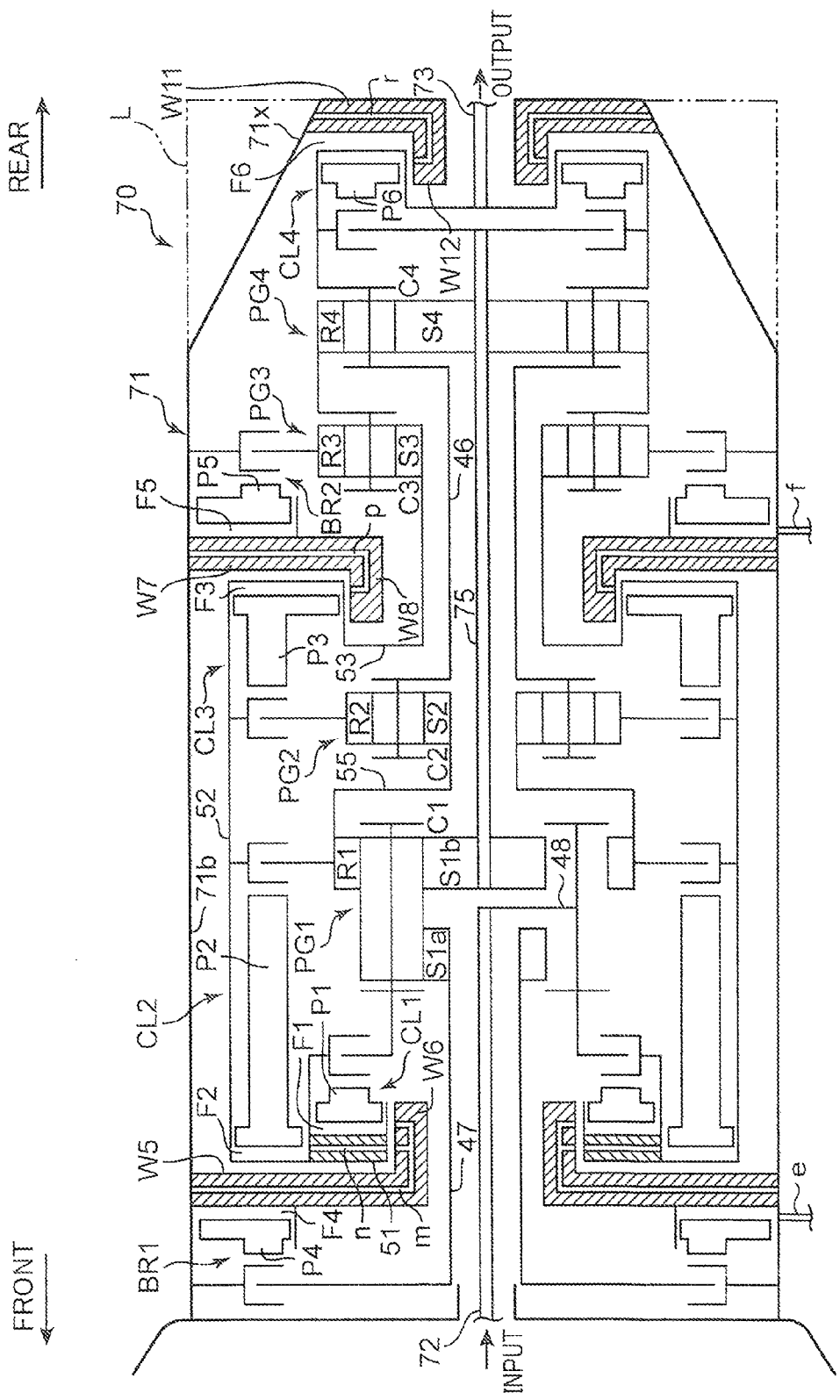
FIG. 9 is a conceptual diagram of an automatic transmission according to a fifth embodiment of the present invention.
Figure 11:
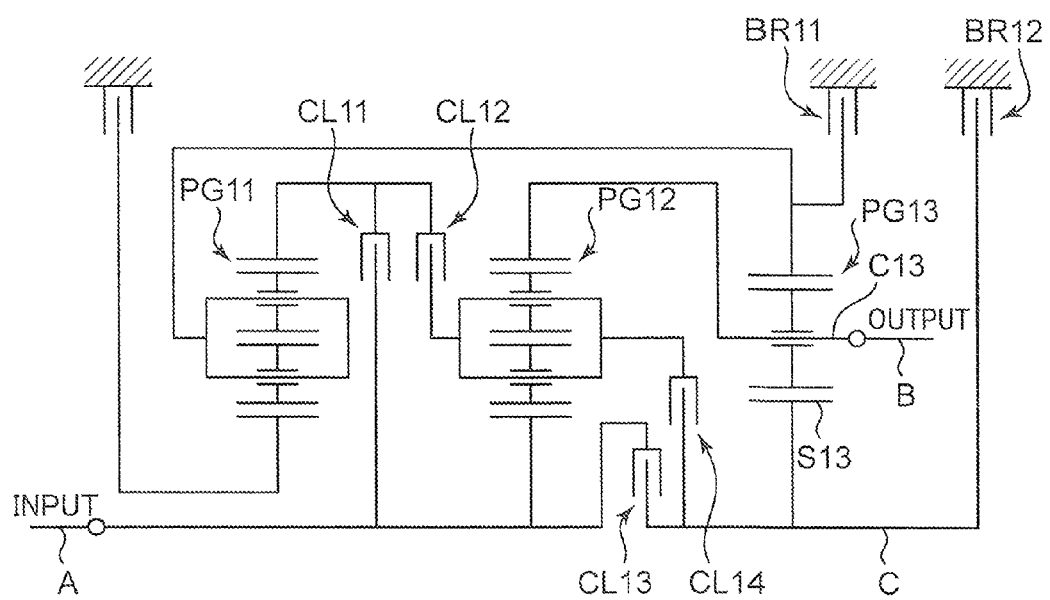
FIG. 11 is a conceptual diagram illustrating a conventional example of a transversely disposed automatic transmission provided with nine forward gear positions.

Next, automatic transmissions 60 and 70 according to fourth and fifth embodiments are described using FIG. 8 and FIG. 9.

As well as the third embodiment, the automatic transmission 60 (see FIG. 8) according to the fourth embodiment includes an input shaft 62 and an output shaft 63 which are coaxially disposed, and a first gear set PG1, a second gear set PG2, a third gear set PG3, and a fourth gear set PG4 disposed in this order from the front side (the drive source side) on the axes of the input shaft 62 and the output shaft 63. Likewise, the automatic transmission 70 (see FIG. 9) according to the fifth embodiment includes an input shaft 72 and an output shaft 73 which are coaxially disposed, and a first gear set PG1, a second gear set PG2, a third gear set PG3, and a fourth gear set PG4 disposed in this order from the front side (the drive source side) on the axes of the input shaft 72 and the output shaft 73.

In the case of the automatic transmissions 60 and 70 according to the fourth and fifth embodiments, a fourth clutch CL4 is additionally included, as a frictional engagement element with respect to the automatic transmission 10 of the first embodiment. The fourth clutch CL4 is disposed in the vicinity of the rear side of the fourth gear set PG4 within a transmission case (61 or 71), specifically, at a position farthest away from the drive source in the axis direction. Note that regarding first to third clutches CL1 to CL3, and first and second brakes BR1 and BR2 of the automatic transmissions 60 and 70, a connection relationship between rotary elements, and an engagement/disengagement relationship between rotary elements or between a transmission case and a rotary element by a frictional engagement element are the same as in the automatic transmission 10 according to the third embodiment.

In the case of the automatic transmission 60 of the fourth embodiment illustrated in FIG. 8, the fourth clutch CL4 disconnectably connects a fourth ring gear R4 to a fourth carrier C4 and the output shaft 63. Specifically, the fourth clutch CL4 includes an inner holding member rotatably connected to the output shaft 63, a hub-side frictional plate engaged with the outer surface of the inner holding member, an outer holding member rotatably connected to the fourth ring gear R4, a drum-side frictional plate engaged with the inner surface of the outer holding member, and a piston P6 projectably and retractably driven in the axis direction for press contact between the hub-side frictional plate and the drum-side frictional plate.

Further, in the automatic transmission 60 of the fourth embodiment, the transmission case 61 includes an annular vertical rear wall portion W9 extending radially inwardly from an inner surface 61b of the rear end of the transmission case 61, and a tubular rear wall portion W10 of a tubular shape, which extends forwardly from the inner peripheral end of the vertical rear wall portion W9. The piston P6 is accommodated in a housing, which is formed to extend rearwardly from the vertical rear wall portion W9 at a position radially outside of the tubular rear wall portion W10. An oil passage q for supplying hydraulic oil to the hydraulic chamber F6 defined by the housing is formed in the vertical rear wall portion W9 and the tubular rear wall portion W10.

On the other hand, in the case of the automatic transmission 70 of the fifth embodiment illustrated in FIG. 9, the fourth clutch CL4 disconnectably connects a fourth sun gear S4 to a fourth carrier C4 and the output shaft 73. Specifically, the fourth clutch CL4 includes an inner holding member rotatably connected to a power transmission member 75 for connecting between a rear-side first sun gear S1b and the fourth sun gear S4, a hub-side frictional plate engaged with the outer surface of the inner holding member, an outer holding member rotatably connected to the fourth carrier C4 and the output shaft 73, a drum-side frictional plate engaged with the inner surface of the outer holding member, and a piston P6 projectably and retractably driven in the axis direction for press contact between the hub-side frictional plate and the drum-side frictional plate.

Further, in the automatic transmission 70 of the fifth embodiment, the transmission case 71 includes an annular vertical rear wall portion W11 extending radially inwardly from an inner surface 71b of the rear end of the transmission case 71, and a tubular rear wall portion W12 of a tubular shape, which extends forwardly from the inner peripheral end of the vertical rear wall portion W11. The piston P6 is accommodated in a housing, which is formed to extend rearwardly from the vertical rear wall portion W11 at a position radially outside of the tubular rear wall portion W12. An oil passage r for supplying hydraulic oil to the hydraulic chamber F6 defined by the housing is formed in the vertical rear wall portion W11 and the tubular rear wall portion W12.

According to the automatic transmissions 60 and 70 of the fourth and fifth embodiments having the aforementioned configuration, as illustrated by the engagement table of FIG. 10, one of first to ninth forward gear positions and one reverse gear position is attained by selective engagement of specific three of the six frictional engagement elements (CL1, CL2, CL3, CL4, BR1, and BR2) on the basis of supply/discharge control of hydraulic oil with respect to the hydraulic chambers F1 to F6.

Specifically, the first gear position is attained when the first clutch CL1, the first brake BR1, and the second brake BR2 are engaged; the second gear position is attained when the second clutch CL2, the first brake BR1, and the second brake BR2 are engaged; the third gear position is attained when the second clutch CL2, the fourth clutch CL4, and the second brake BR2 are engaged; the fourth gear position is attained when the first clutch CL1, the second clutch CL2, and the second brake BR2 are engaged; the fifth gear position is attained when the second clutch CL2, the third clutch CL3, and the second brake BR2 are engaged; the sixth gear position is attained when the first clutch CL1, the third clutch CL3, and the second brake BR2 are engaged; the seventh gear position is attained when the first clutch CL1, the second clutch CL2, and the third clutch CL3 are engaged; the eighth gear position is attained when the first clutch CL1, the third clutch CL3, and the first brake BR1 are engaged; the ninth gear position is attained when the second clutch CL2, the third clutch CL3, and the first brake BR1 are engaged; and the reverse gear position is attained when the third clutch CL3, the first brake BR1, and the second brake BR2 are engaged.

According to the automatic transmissions 60 and 70 of the fourth and fifth embodiments, as well as the automatic transmission 10 of the third embodiment, the input shafts 62 and 72 pass through (the center portion of) the front-side first sun gear S1*a* of the first gear set PG1 of a double sun gear type, and the output shafts 63 and 73 are constantly coupled to the fourth gear set PG4. Therefore, it is possible to avoid an increase in the diameter of a planetary gear set by a configuration, in which the output shafts 63 and 73 whose diameter is made large for transmission of a large torque pass through a split sun gear. This makes it possible to reduce the diameter of a portion of the transmission case 41 surrounding the fourth gear set PG4 to form reduced diameter portions 61*x* and 71*x*. This is advantageous in reducing the diameter of an end portion of the automatic transmissions 60 and 70 on the output side, as compared with a case in which the fourth gear set PG4 is configured as a double sun gear type gear set (transmission cases in this case are illustrated by two-dotted chain lines L in FIG. 8 and FIG. 9).

Further, according to the fourth and fifth embodiments, adding the fourth clutch CL4 makes it possible to further increase the number of gear positions of the automatic transmissions 60 and 70. Engaging the frictional engagement elements on the basis of the engagement table illustrated in FIG. 10 makes it possible to implement a gearshift pattern constituted by nine forward gear positions and one reverse gear position, in which a gear ratio between the gear positions is appropriately set.

Lastly, the features and the advantageous effects disclosed in the embodiments will be briefly described.

An automatic transmission according to the embodiments includes an input shaft coupled to a drive source; an output shaft disposed coaxially with the input shaft on a side of the input shaft opposite to the drive source; a first planetary gear set including a first sun gear, a first carrier, and a first ring gear; a second planetary gear set disposed on a side of the first planetary gear set opposite to the drive source, and including a second sun gear, a second carrier, and a second ring gear; a first brake disposed on a drive source side of the first planetary gear set; and a transmission case which accommodates the first planetary gear set, the second planetary gear set, and the first brake. The first sun gear includes a first split sun gear on s drive source side, and a second split sun gear on s side opposite to the drive source. The first split sun gear is coupled to the first brake, and is fixed to the transmission case during engagement of the first brake. The second split sun gear is constantly coupled to the second sun gear. The input shaft is constantly coupled to the first carrier while passing through the first split sun gear, and between the first and second split sun gears. The output shaft is constantly coupled to the second carrier.

According to the aforementioned configuration, the input shaft passes through the first split sun gear of the first planetary gear set, and the output shaft is constantly coupled to the second planetary gear set. Therefore, it is possible to avoid an increase in the diameter of a planetary gear set by a configuration, in which an output shaft whose diameter is made large for transmission of a large torque passes through a split sun gear. This is advantageous in suppressing an increase in the diameter of an end portion of the automatic transmission on the output side, and in suppressing deterioration of seating comfort on a driver's seat and a passenger's seat of an FR vehicle due to the increase in the diameter.

In this case, the input shaft passes through a split sun gear. However, a transmission torque of an input shaft is small as compared with a transmission torque of an output shaft. This makes it possible to make the diameter of an input shaft small. Thus, an increase in the diameter of the first planetary gear set is small, and it is possible to suppress an increase in the diameter of the automatic transmission on the input side.

Preferably, the automatic transmission may further include a third planetary gear set having a third sun gear, a third carrier, and a third ring gear; a fourth planetary gear set having a fourth sun gear, a fourth carrier, and a fourth ring gear; a first clutch, a second clutch, and a third clutch; and a second brake. The first ring gear and the third sun gear may be constantly coupled to each other. The second carrier and the third carrier may be constantly coupled to each other. The second ring gear and the fourth carrier may be constantly coupled to each other. The first clutch may disconnectably connect the fourth sun gear to the input shaft and the first carrier. The second clutch may disconnectably connect the fourth sun gear to the first ring gear and the third sun gear. The third clutch may disconnectably connect the fourth sun gear to the third ring gear. The second brake may disconnectably connect the fourth ring gear to the transmission case.

According to the aforementioned configuration, it is possible to advantageously implement an automatic transmission that enables to obtain the aforementioned effects.

In the aforementioned configuration, more preferably, a first gear position may be attained when the first clutch, the first brake, and the second brake are engaged. A second gear position may be attained when the second clutch, the first brake, and the second brake are engaged. A third gear position may be attained when the first clutch, the second clutch, and the second brake are engaged. A fourth gear position may be attained when the second clutch, the third clutch, and the second brake are engaged. A fifth gear position may be attained when the first clutch, the third clutch, and the second brake are engaged. A sixth gear position may be attained when the first clutch, the second clutch, and the third clutch are engaged. A seventh gear position may be attained when the first clutch, the third clutch, and the first brake are engaged. An eighth gear position may be attained when the second clutch, the third clutch, and the first brake are engaged. A reverse gear position may be attained when the third clutch, the first brake, and the second brake are engaged.

According to the aforementioned configuration, it is possible to implement a gearshift pattern constituted by eight forward gear positions and one reverse gear position, in which a gear ratio between the gear positions is appropriately set.

The automatic transmission may further include a fourth clutch which disconnectably connects the second sun gear to the second carrier and the output shaft, or disconnectably connects the second ring gear to the second carrier and the output shaft.

According to the aforementioned configuration, it is possible to further increase the number of gear positions of an automatic transmission by adding the fourth clutch.

In the configuration in which the fourth clutch is added, more preferably, a first gear position may be attained when the first clutch, the first brake, and the second brake are engaged. A second gear position may be attained when the second clutch, the first brake, and the second brake are engaged. A third gear position may be attained when the second clutch, the fourth clutch, and the second brake are engaged. A fourth gear position may be attained when the first clutch, the second clutch, and the second brake are engaged. A fifth gear position may be attained when the second clutch, the third clutch, and the second brake are engaged. A sixth gear position may be attained when the first clutch, the third clutch, and the second brake are engaged. A seventh gear position may be attained when the first clutch, the second clutch, and the third clutch are engaged. An eighth gear position may be attained when the first clutch, the third clutch, and the first brake are engaged. A ninth gear position may be attained when the second clutch, the third clutch, and the first brake are engaged. A reverse gear position may be attained when the third clutch, the first brake, and the second brake are engaged.

According to the aforementioned configuration, it is possible to implement an automatic transmission provided with nine forward gear positions and one reverse gear position, in which a gear ratio between the gear positions is appropriately set.

INDUSTRIAL APPLICABILITY

As described above, according to the present invention, it is possible to provide a compact and longitudinally disposed automatic transmission that enables to reduce the diameter of an end portion of the automatic transmission on the output side. Therefore, the present invention is advantageously used in the manufacturing technical field of longitudinally disposed vehicular automatic transmissions, and vehicles for longitudinally disposed automatic transmissions.

The invention claimed is:

1. An automatic transmission, comprising:
an input shaft coupled to a drive source;
an output shaft disposed coaxially with the input shaft on a side of the input shaft opposite to the drive source;
a first planetary gear set including a first sun gear, a first carrier, and a first ring gear;
a second planetary gear set disposed on a side of the first planetary gear set opposite to the drive source, and including a second sun gear, a second carrier, and a second ring gear;
a third planetary gear set including a third sun gear, a third carrier, and a third ring gear;
a fourth planetary gear set including a fourth sun gear, a fourth carrier, and a fourth ring gear;
a first clutch, a second clutch, and a third clutch;
a first brake disposed on a drive source side of the first planetary gear set;
a second brake; and
a transmission case which accommodates the first planetary gear set, the second planetary gear set, the third planetary gear set, the fourth planetary gear set, the first clutch, the second clutch, the third clutch, the first brake, and the second brake, wherein
the first sun gear includes a first split sun gear on a drive source side, and a second split sun gear on a side opposite to the drive source,
the first split sun gear is coupled to the first brake, and is fixed to the transmission case during engagement of the first brake,
the second split sun gear is constantly coupled to the second sun gear,
the input shaft is constantly coupled to the first carrier while passing through the first split sun gear, and between the first and second split sun gears,
the output shaft is constantly coupled to the second carrier,
the first ring gear and the third sun gear are constantly coupled to each other,
the second carrier and the third carrier are constantly coupled to each other,
the second ring gear and the fourth carrier are constantly coupled to each other,
the first clutch disconnectably connects the fourth sun gear to the input shaft and the first carrier,
the second clutch disconnectably connects the fourth sun gear to the first ring gear and the third sun gear,
the third clutch disconnectably connects the fourth sun gear to the third ring gear, and
the second brake disconnectably connects the fourth ring gear to the transmission case.

2. The automatic transmission according to claim 1, wherein
a first gear position is attained when the first clutch, the first brake, and the second brake are engaged,
a second gear position is attained when the second clutch, the first brake, and the second brake are engaged,
a third gear position is attained when the first clutch, the second clutch, and the second brake are engaged,
a fourth gear position is attained when the second clutch, the third clutch, and the second brake are engaged,
a fifth gear position is attained when the first clutch, the third clutch, and the second brake are engaged,
a sixth gear position is attained when the first clutch, the second clutch, and the third clutch are engaged,
a seventh gear position is attained when the first clutch, the third clutch, and the first brake are engaged,
an eighth gear position is attained when the second clutch, the third clutch, and the first brake are engaged, and
a reverse gear position is attained when the third clutch, the first brake, and the second brake are engaged.

3. The automatic transmission according to claim 1, further comprising:
a fourth clutch which disconnectably connects the second sun gear to the second carrier and the output shaft, or disconnectably connects the second ring gear to the second carrier and the output shaft.

4. The automatic transmission according to claim 3, wherein
a first gear position is attained when the first clutch, the first brake, and the second brake are engaged,
a second gear position is attained when the second clutch, the first brake, and the second brake are engaged,
a third gear position is attained when the second clutch, the fourth clutch, and the second brake are engaged,
a fourth gear position is attained when the first clutch, the second clutch, and the second brake are engaged,
a fifth gear position is attained when the second clutch, the third clutch, and the second brake are engaged,
a sixth gear position is attained when the first clutch, the third clutch, and the second brake are engaged,
a seventh gear position is attained when the first clutch, the second clutch, and the third clutch are engaged,
an eighth gear position is attained when the first clutch, the third clutch, and the first brake are engaged,
a ninth gear position is attained when the second clutch, the third clutch, and the first brake are engaged, and
a reverse gear position is attained when the third clutch, the first brake, and the second brake are engaged.

* * * * *